US012296305B2

(12) United States Patent
Kim et al.

(10) Patent No.: US 12,296,305 B2
(45) Date of Patent: May 13, 2025

(54) MIXING SYSTEM

(71) Applicant: Sabic SK Nexlene Company Pte. Ltd., Singaore (SG)

(72) Inventors: Myoungil Kim, Daejeon (KR); Daeho Shin, Daejeon (KR); Choonsik Shim, Daejeon (KR); Hyunmin Jang, Daejeon (KR); Minsu Jeong, Daejeon (KR)

(73) Assignee: Sabic SK Nexlene Company Pte. Ltd., Singapore (SG)

( * ) Notice: Subject to any disclaimer, the term of this patent is extended or adjusted under 35 U.S.C. 154(b) by 1116 days.

(21) Appl. No.: 16/959,745

(22) PCT Filed: Jan. 3, 2019

(86) PCT No.: PCT/IB2019/050041

§ 371 (c)(1),
(2) Date: Jul. 2, 2020

(87) PCT Pub. No.: WO2019/135187

PCT Pub. Date: Jul. 11, 2019

(65) Prior Publication Data

US 2020/0368700 A1 Nov. 26, 2020

(30) Foreign Application Priority Data

Jan. 5, 2018 (KR) ........................ 10-2018-0001571

(51) Int. Cl.

*B01F 23/451* (2022.01)
*B01F 23/47* (2022.01)
*B01F 25/4314* (2022.01)

(52) U.S. Cl.

CPC ............ *B01F 23/451* (2022.01); *B01F 23/47* (2022.01); *B01F 25/4314* (2022.01); *B01F 23/471* (2022.01); *B01F 2215/0418* (2013.01)

(58) Field of Classification Search

CPC ................ B01F 23/451; B01F 25/4314; B01F 25/43141; B01F 25/4315; B01F 25/431

(Continued)

(56) References Cited

U.S. PATENT DOCUMENTS 3,635,444 A 1/1972 Potter
3,953,002 A 4/1976 England, Jr. et al.

(Continued)

FOREIGN PATENT DOCUMENTS

CN 1116963 A 2/1996
CN 103230749 A 8/2013

(Continued)

OTHER PUBLICATIONS

Machine translation of CN103230749, accessed via worldwide.espacenet.com on Feb. 22, 2024.*

*Primary Examiner* — Marc C Howell

(74) *Attorney, Agent, or Firm* — The Webb Law Firm

(57) ABSTRACT

Provided is a mixing system to mix different types of fluids more efficiently. The mixing system installed in a piping in which a first fluid is supplied includes a mixing part including a plurality of mixing members each having a front end and a rear end rotated by a predetermined angle to form a curved surface and disposed to be spaced apart from each other and a supply part supplying a second fluid to a space between adjacent mixing members.

11 Claims, 8 Drawing Sheets

(58) Field of Classification Search
USPC .......................................................... 366/338
See application file for complete search history.

(56) References Cited

U.S. PATENT DOCUMENTS

| | | | |
|---|---|---|---|
| 6,705,757 B2 | 3/2004 | Lyons et al. | |
| 8,177,197 B1 | 5/2012 | Ergican | |
| 8,876,365 B2 * | 11/2014 | Pollard | B01F 25/31322 366/175.2 |
| 2001/0003291 A1 | 6/2001 | Uematsu et al. | |
| 2008/0056064 A1 * | 3/2008 | Tanaka | B29B 7/7457 366/339 |
| 2009/0115096 A1 * | 5/2009 | Ito | B29B 7/325 264/241 |
| 2009/0122638 A1 | 5/2009 | Sato et al. | |
| 2011/0305102 A1 * | 12/2011 | Berger | B01F 25/3132 366/154.1 |
| 2013/0107660 A1 | 5/2013 | Pappalardo | |
| 2013/0319465 A1 | 12/2013 | Brown | |
| 2016/0243510 A1 | 8/2016 | Denton et al. | |
| 2017/0291155 A1 | 10/2017 | VanDalsem et al. | |

FOREIGN PATENT DOCUMENTS

| | | | |
|---|---|---|---|
| EP | 0006734 | A1 | 1/1980 |
| EP | 3056704 | A1 | 8/2016 |
| FR | 2165244 | A5 | 8/1973 |
| JP | S4990971 | U | 8/1974 |
| JP | S5024846 | A | 3/1975 |
| JP | S5339869 | U | 4/1978 |
| JP | S60187325 | A | 9/1985 |
| JP | S60227819 | A | 11/1985 |
| JP | H2251236 | A | 10/1990 |
| JP | H360727 | A | 3/1991 |
| JP | H6254369 | A | 9/1994 |
| JP | H7284642 | A | 10/1995 |
| JP | 3145520 | U | 10/2008 |
| JP | 2009113012 | A | 5/2009 |
| KR | 1020120121884 | A | 11/2012 |
| WO | 9700122 | A1 | 1/1997 |
| WO | 2017190759 | A1 | 11/2017 |

* cited by examiner

Prior Art

[Fig. 2]
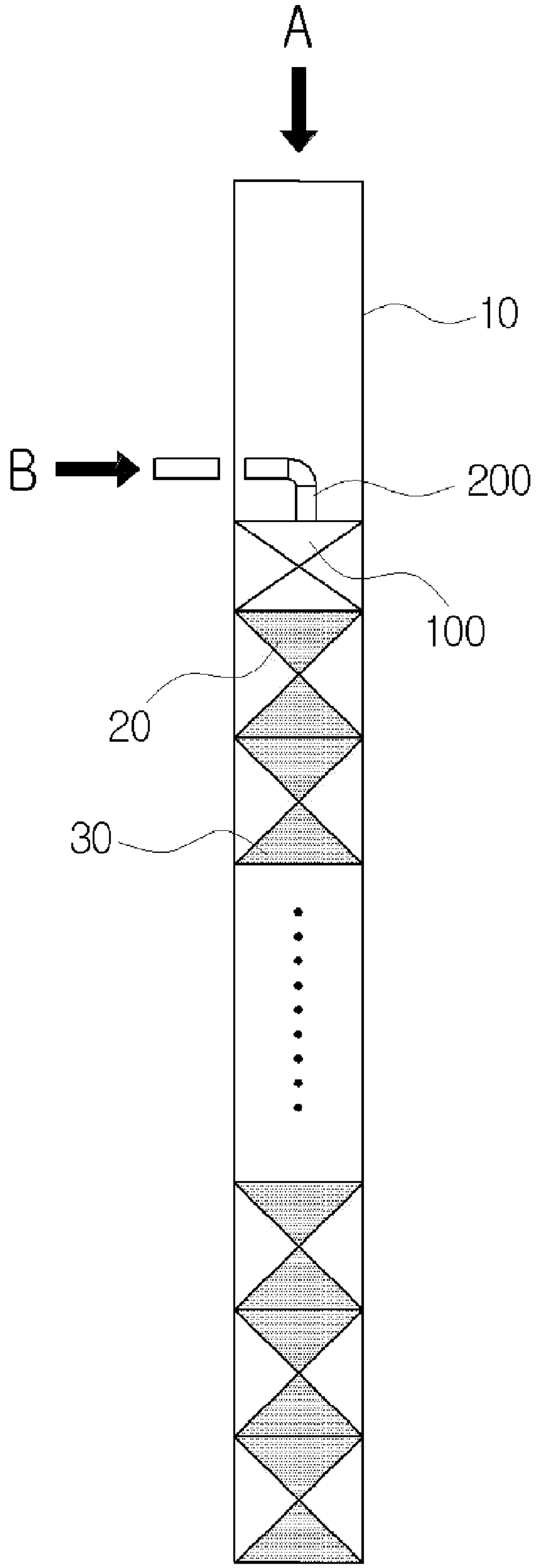

[Fig. 3]
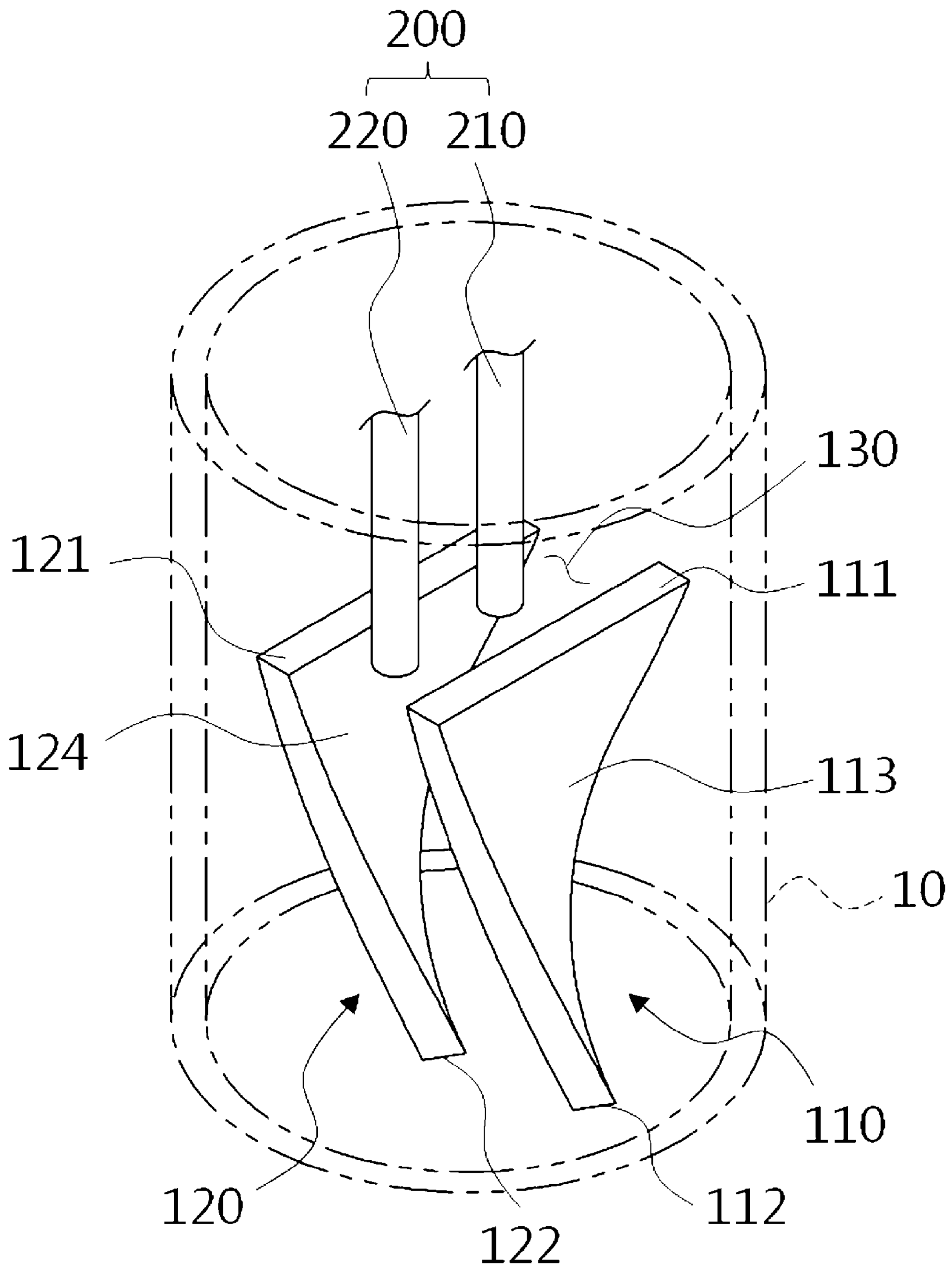

[Fig. 4]
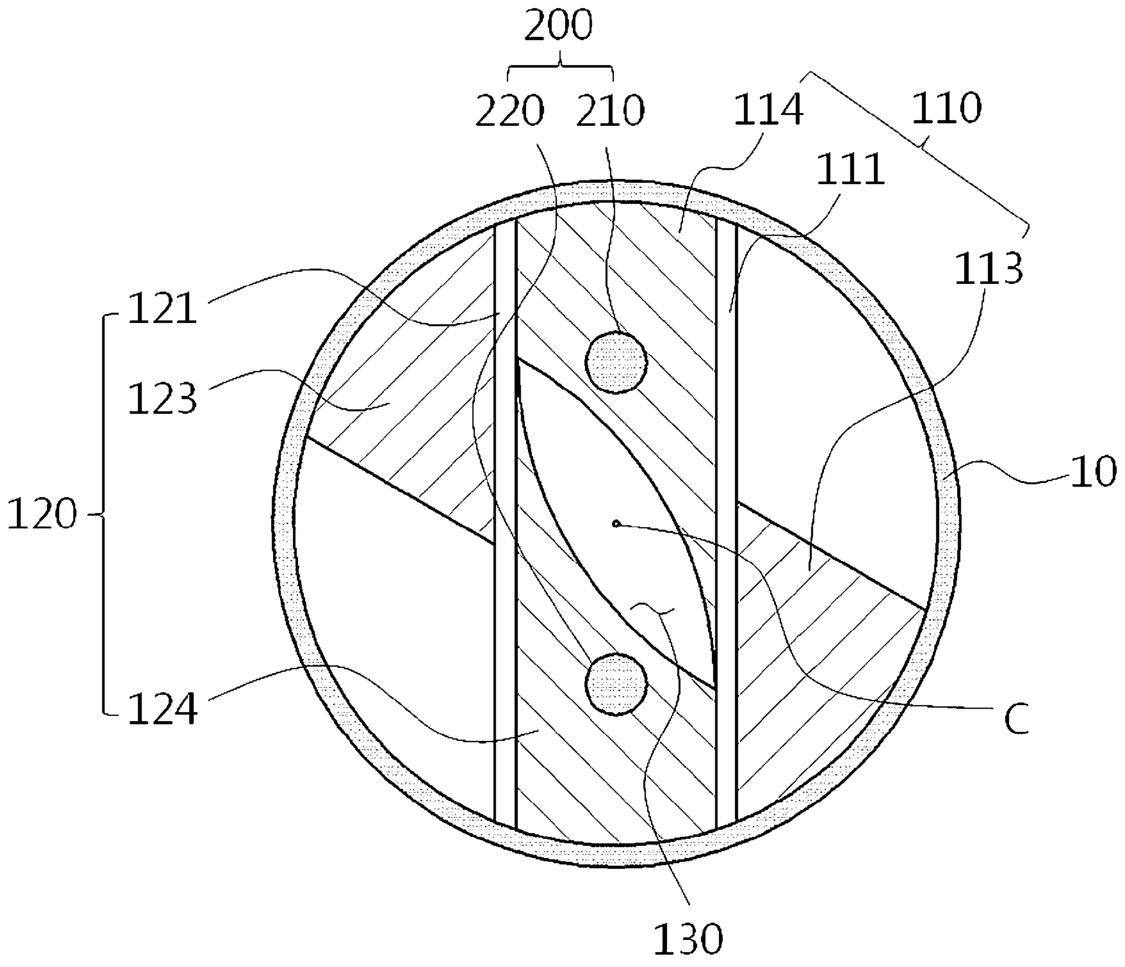

[Fig. 5]
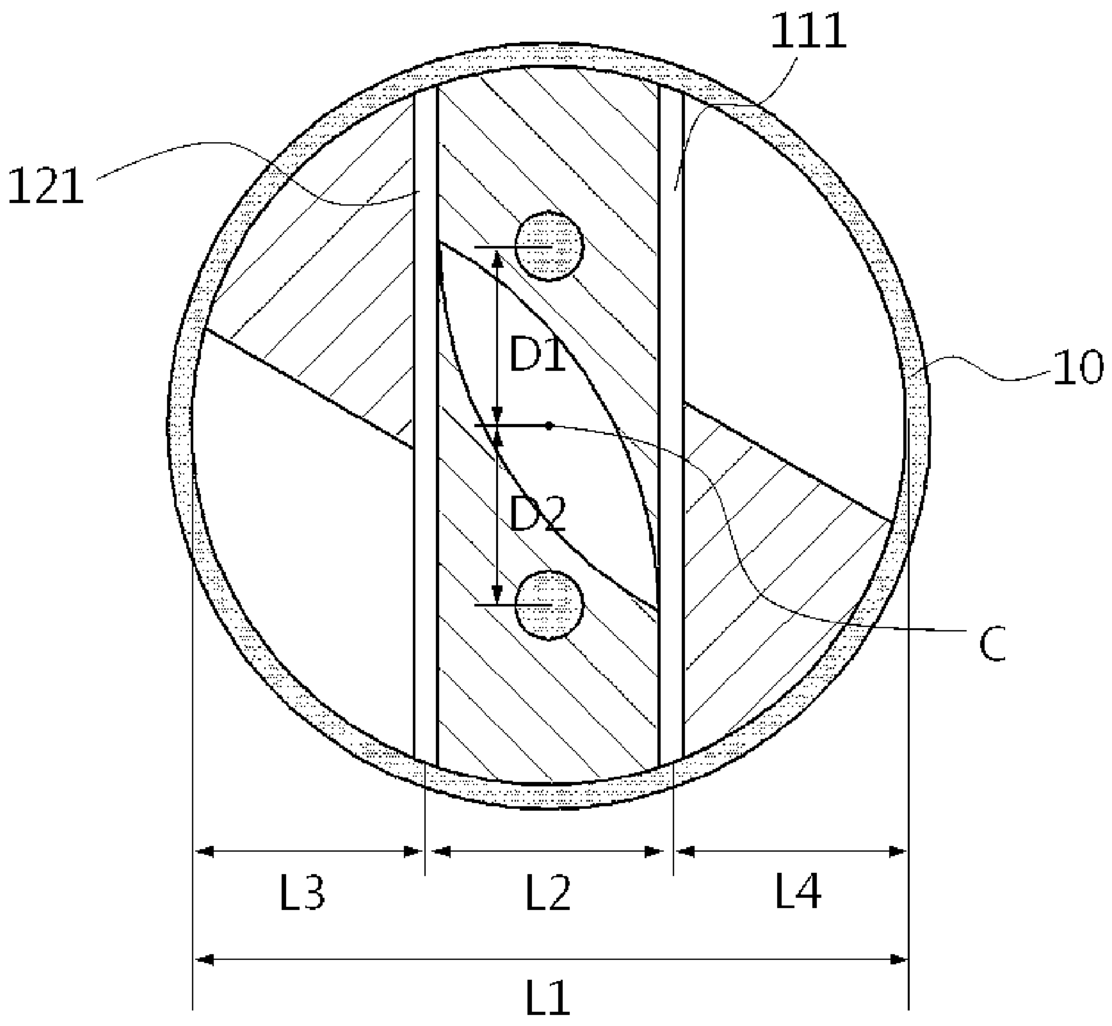

[Fig. 6]
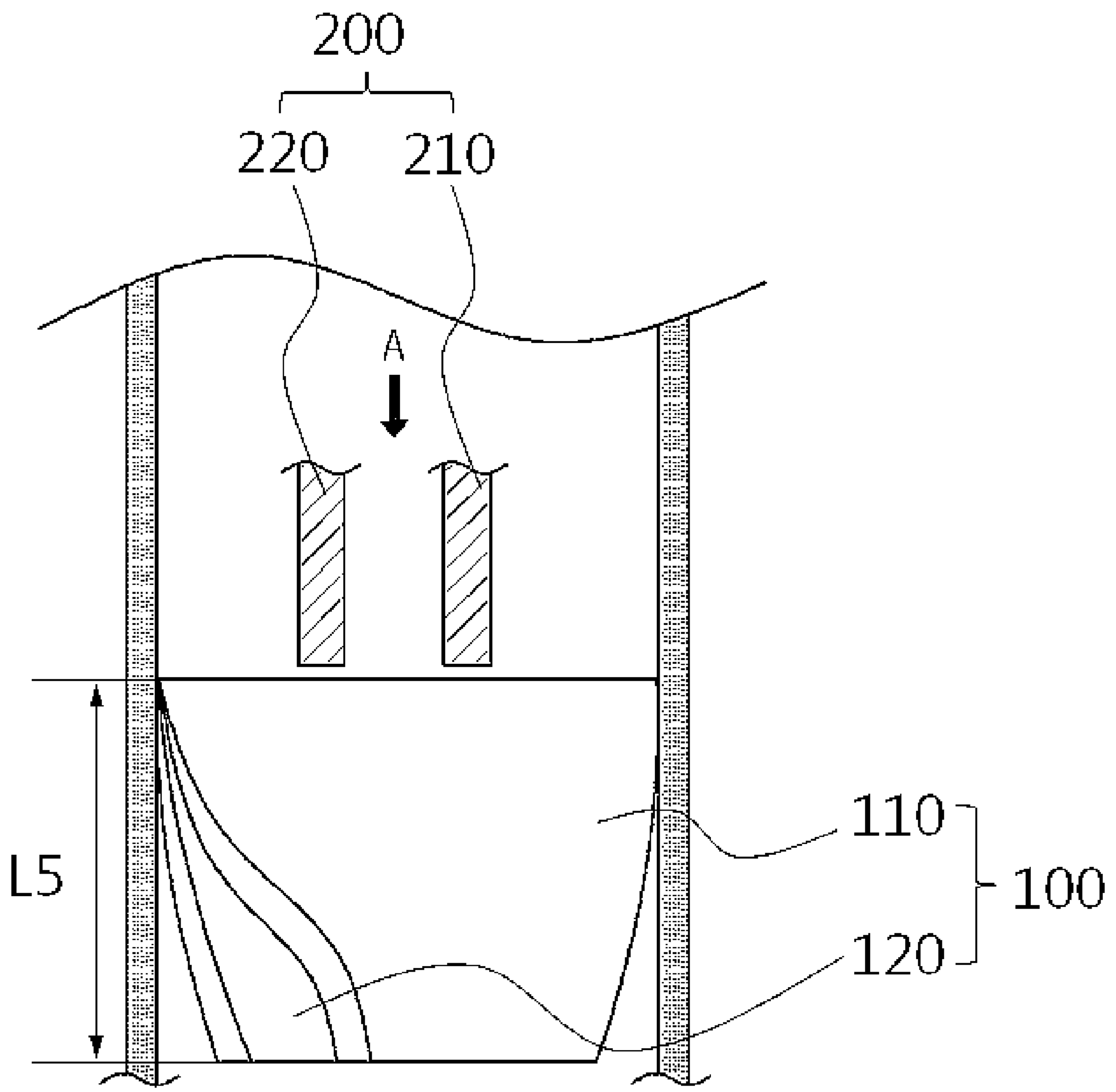

[Fig. 7]
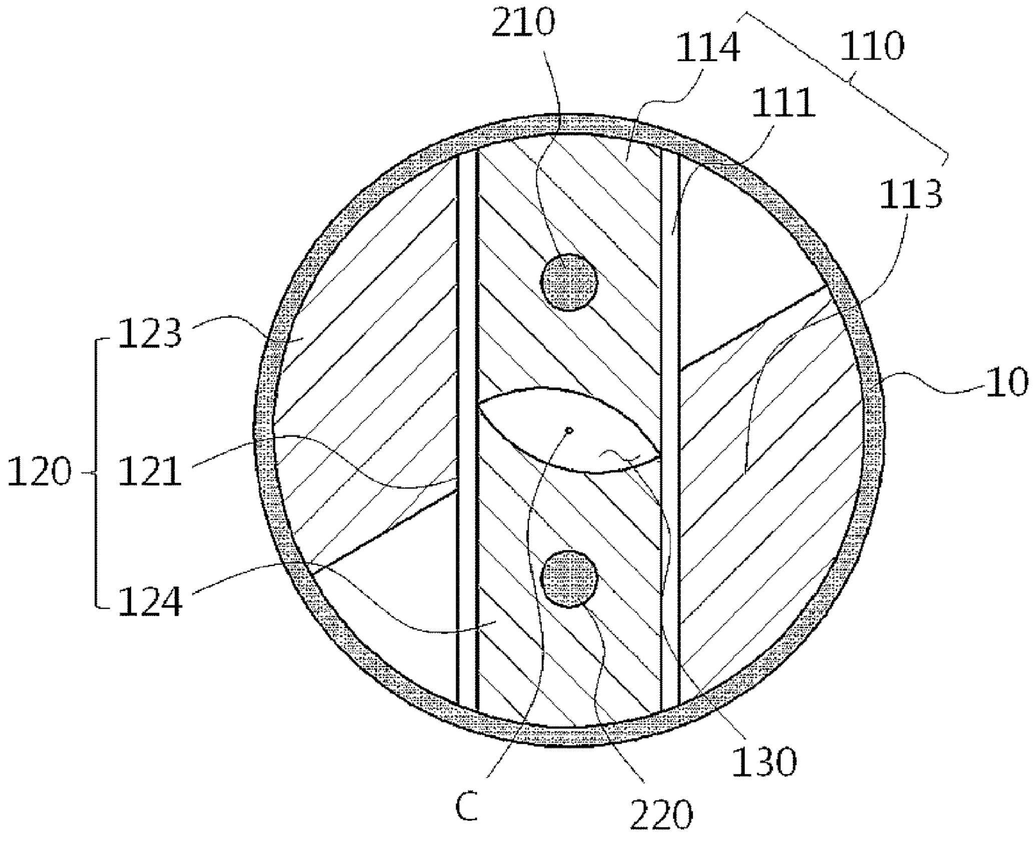
[Fig. 8]
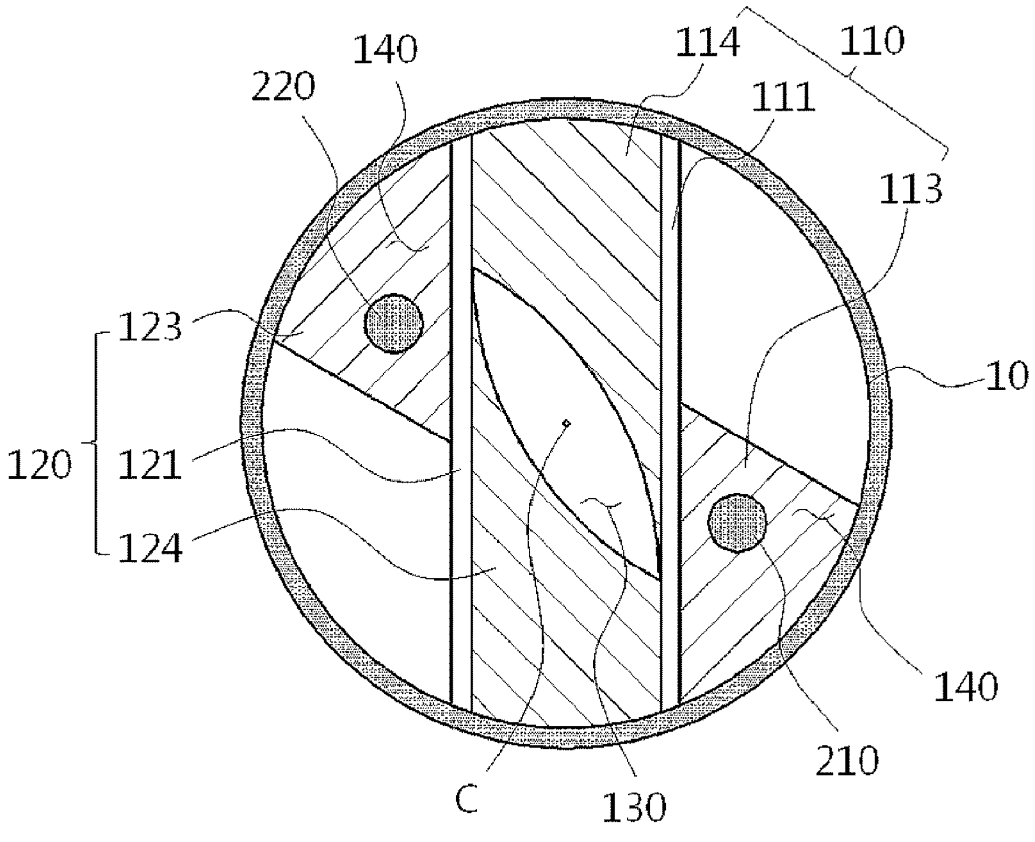

[Fig. 9]
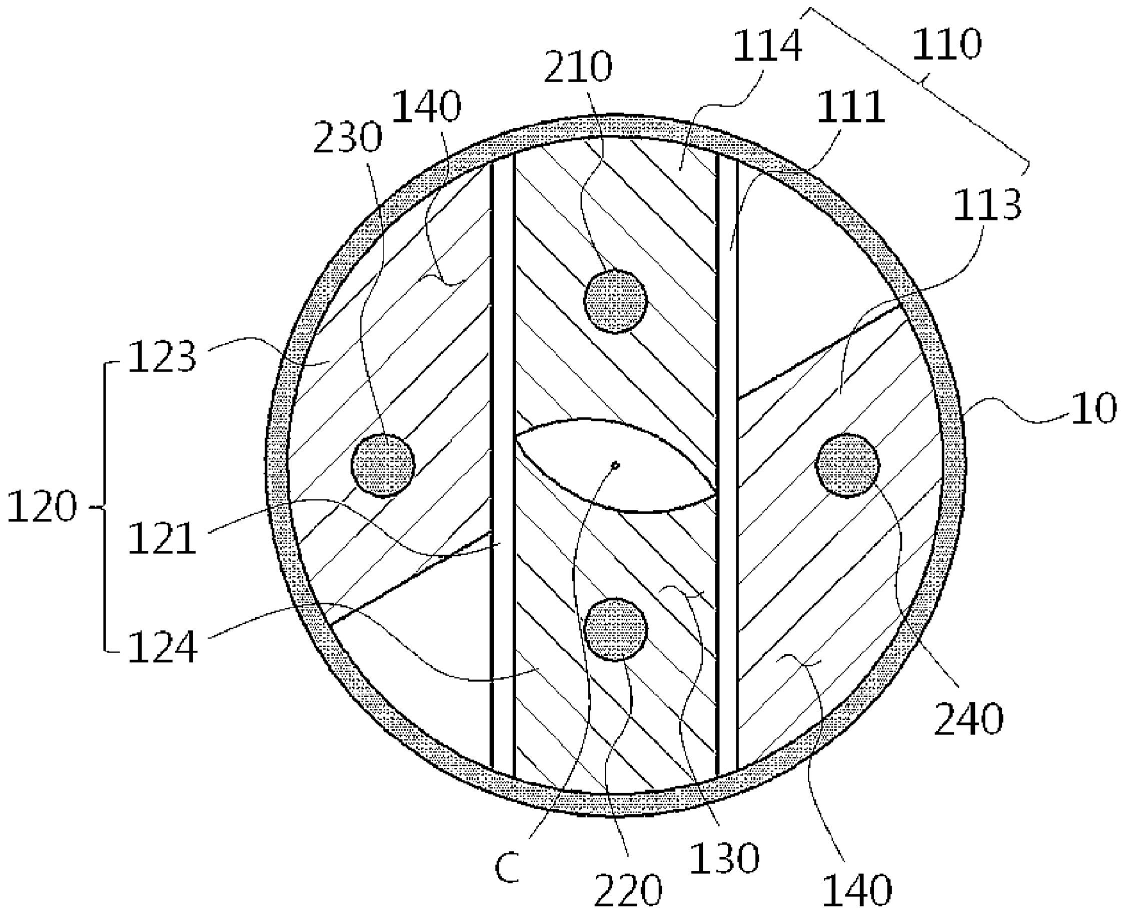

MIXING SYSTEM

CROSS-REFERENCE TO RELATED APPLICATIONS

This application is the United States national phase of International Application No. PCT/IB2019/050041 filed Jan. 3, 2019, and claims priority to Korean Patent Application No. 10-2018-0001571 filed Jan. 5, 2018, the disclosures of which are hereby incorporated by reference in their entirety.

TECHNICAL FIELD

The present invention relates to a mixing system to more efficiently mix different types of fluids.

BACKGROUND ART

A static mixer is a kind of mixing device continuously mixing a fluid which passes through a piping, without a moving part. The static mixer has excellent mixing efficiency, is free of noise and vibration because it does not have a moving part, and does not require maintenance. Therefore, a mixing system using the static mixer is used in various fields.

FIG. 1 schematically illustrates a general static mixer. As illustrated in FIG. 1, the static mixer is installed in a piping 10 to mix fluid introduced from one side of the piping 10. The fluid introduced from one side of the piping 10 is mixed, while passing through a right side mixing element 20 and a left side mixing element 30 which are arranged alternately.

The right side mixing element 20 illustrated in FIG. 1 has a rear end rotated to be twisted by 180 degrees to the right as compared with a front end thereof, and the left side mixing element 30 has a rear end rotated to be twisted by 180 degrees to the left as compared with a front end thereof (the front end is an edge close to a side to which the fluid is introduced and the rear end is an edge away from the side to which the fluid is introduced). The rear end of the right side mixing element 20 is disposed at the rear and crisscrosses the front end of the left side mixing element 30 in contact therewith and the rear end of the left side mixing element 30 and the front end of the right side mixing element 20 disposed at the rear also crisscross each other. That is, the right and left side mixing elements are alternately installed so a flow direction of the fluid is reversed (rotational circulation) and flow of the fluid is changed (radical mixing), and accordingly, the fluid is easily mixed.

Meanwhile, recently, techniques of increasing efficiency of a mixing system by disposing a mixing element having a different shape from that of a static mixer in front of the static mixer, such as disclosed in Korean Patent Laid-Open Publication No. 10-2012-0121884 ("Mixing System Including Extensional Flow Mixer", published on Nov. 6, 2012) (hereinafter, referred to as "related art 1") have been introduced.

RELATED ART DOCUMENT

Patent Document

Korean Patent Laid-Open Publication No. 10-2012-0121884 ("Mixing System Including Extensional Flow Mixer", published on Nov. 6, 2012)

DISCLOSURE OF INVENTION

Technical Problem

An object of the present invention is to provide a mixing system to improve mixing efficiency.

Solution to Problem

In one general aspect, A mixing system, the mixing system comprising: a piping which a first fluid is supplied; a mixing part including a plurality of mixing members installed in the piping, installed in a flow direction of the first fluid, having a plate-like shape in which a rear end thereof is twisted by a predetermined angle from a front end thereof, and disposed to be spaced apart from each other; and a supply part supplying a second fluid to a space between adjacent mixing members or a space between internal surface of the piping and each of the mixing members.

Also, the rear end of each mixing member may be twisted at an angle of 45 to 180 degrees from the front end thereof.

A length of each mixing member from the front end to the rear end may be 0.4 to 1.2 times a diameter of the piping.

A distance between the mutually adjacent mixing members may be 0.2 to 0.6 times a diameter of the piping.

The supply part may supply the second fluid to the inside of the piping through a plurality of flow paths.

The supply part may supply the second fluid to a curved surface form on each side of each mixing member through at least one or more pairs of flow paths.

With respect to the length of the piping, a position of an end of the supply part through which the second fluid is discharged may be the same as a position of the front end of each mixing member or the end of the supply part may be positioned on a rear side, relative to the front end of each mixing member.

The first fluid may have viscosity higher than viscosity of the second fluid.

The first fluid may have viscosity 50 to 50000 times viscosity of the second fluid.

The first fluid may be supplied in an amount larger than the second fluid.

The amount of the second fluid supplied to the piping may be 1 wt % or less of the first fluid.

The mixing system may further include: a static mixer disposed at a rear end of the mixing part.

Advantageous Effects of Invention

According to the mixing system including an extensional mixing element of the exemplary embodiment of the present invention, since the first fluid and the second fluid introduced into the piping are mixed first through the curved surface formed inside the mixing part and subsequently mixed by the static mixer, mixing efficiency is improved.

BRIEF DESCRIPTION OF DRAWINGS

FIG. 2 is a schematic diagram of a mixing system according to an exemplary embodiment of the present invention.

FIG. 3 is a perspective view of an extensional mixing element according to a first exemplary embodiment of the present invention.

FIGS. 4 and 5 are top cross-sectional views of an extensional mixing element according to the first exemplary embodiment of the present invention.

FIG. 6 is a side view of the extensional mixing element according to the first exemplary embodiment of the present invention.

FIG. 7 is a top cross-sectional view of an extensional mixing element according to a second exemplary embodiment of the present invention.

FIG. 8 is a top cross-sectional view of an extensional mixing element according to a third exemplary embodiment of the present invention.

FIG. 9 is a top cross-sectional view of an extensional mixing element according to a fourth exemplary embodiment of the present invention.

BEST MODE FOR CARRYING OUT THE INVENTION

Figure 1:
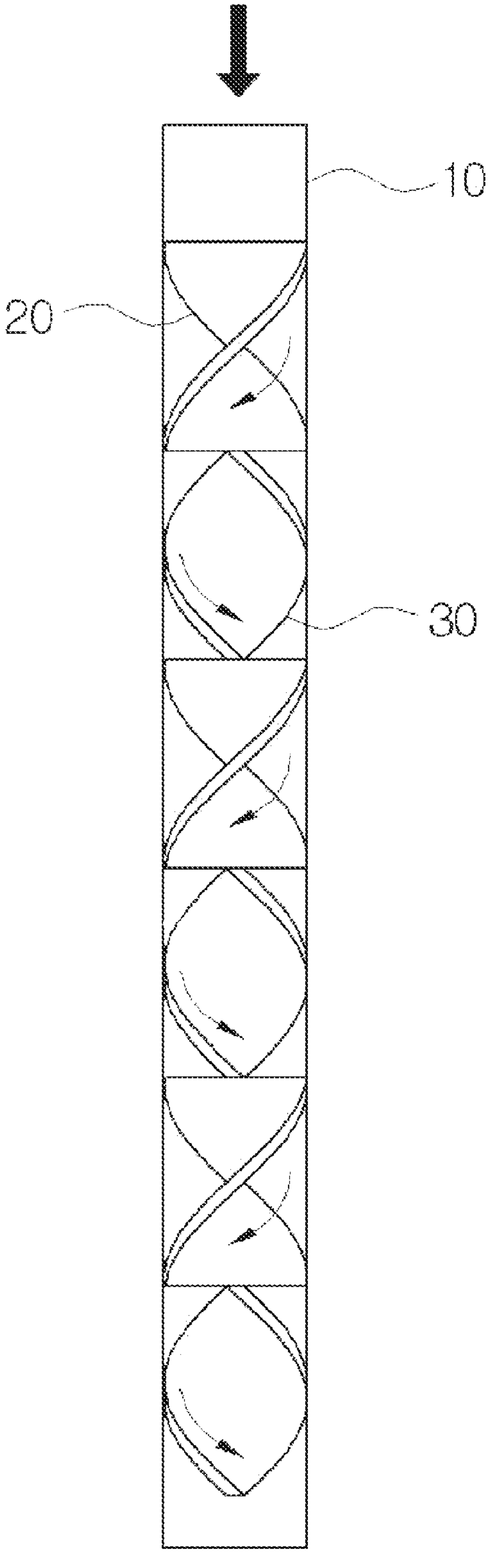
FIG. 1 is a schematic diagram of a mixing system using a static mixer.

Hereinafter, the embodiments of the present invention will be described in detail with reference to accompanying drawings.

Hereinafter, various exemplary embodiments of a mixing system according to the present invention will be described in detail with reference to the accompanying drawings.

The mixing system including an extensional mixing element according to the present invention has a plurality of exemplary embodiments according to exemplary embodiments of the added mixing element, and thus, the mixing system will be first described, and thereafter, exemplary embodiments of the extensional mixing element will be described.

FIG. 2 schematically illustrates a mixing system according to an exemplary embodiment of the present invention.

As illustrated in FIG. 2, a mixing system according to an exemplary embodiment of the present invention, which is to mix a first fluid A and a second fluid B introduced into the piping 10, may include the piping 10, a mixing part 100 and a supply part 200 connected to the inside of the piping 10 from the outside, and may further include: a static mixer installed at a rear end of the mixing part 100.

In an exemplary embodiment of the invention illustrated in FIG. 2, the first fluid A may be a relatively large amount of fluid having high viscosity and the second fluid B may be a relatively small amount of fluid having low viscosity. Specifically, when the first fluid A and the second fluid B are mixed, the second fluid may be less than 1% in a mass ratio with respect to a total mass of the mixed fluid as 100%, and viscosity of the first fluid A may be 50 to 50000 times that of the second fluid B.

The static mixer is the same mixer as that described above in the Background Art. As illustrated in FIG. 2, the right side mixing element 20 and the left side mixing element 30 are alternately arranged at the rear end of the mixing part 100 to mix the fluids introduced through the mixing part 100.

The extensional mixing element, which is a main feature of the present invention, may include the mixing part 100 and the supply part 200 and have various exemplary embodiments according to shapes or positions of the mixing part 100 and the supply part 200. Hereinafter, the exemplary embodiments of the extensional mixing element of the present invention will be described in detail with reference to the accompanying drawings.

Extensional Mixing Element According to First Exemplary Embodiment

FIG. 3 illustrates an extensional mixing element according to a first exemplary embodiment of the present invention. As described above, the extensional mixing element of the present invention is installed at a front end of the mixing system, and thus, FIG. 3 illustrates only a portion of an upper part of FIG. 2.

The mixing part 100 serves to mix the first fluid A and the second fluid B supplied to the inside of the piping, before the first fluid A and the second fluid B are mixed in the static mixer. The mixing part 100 may change flow of the first fluid A and the second fluid B supplied thereto, and may include a plurality of mixing members.

FIG. 3 illustrates an exemplary embodiment of the mixing part 100. As illustrated in FIG. 3, in an exemplary embodiment of the present invention, the mixing part 100 may include a first mixing member 110 and a second mixing member 120.

The first mixing member 110 and the second mixing member 120 may have the same structure, may be installed inside the piping 10 and may be spaced apart from each other by a predetermined interval. The first mixing member 110 and the second mixing member 120 may be fixed to and installed in the inside of the piping 10 in various manners, and in an exemplary embodiment of the present invention, the first mixing member 110 and the second mixing member 120 may be fixed to the piping 10 by welding.

As illustrated in FIG. 3, the first mixing member 110 and the second mixing member 120 have a twisted plate-like shape and may be installed in a flow direction of the first fluid A supplied to the piping 10. Hereinafter, for the purposes of description, an end of a portion to which the first fluid A is introduced will be referred to as a front end and an end of a portion from which the first fluid A is discharged will be referred to as a rear end.

As illustrated in FIG. 3, the first mixing member 110 includes a first outer side curved surface 113 and a first inner side curved surface 114 formed on both twisted side surfaces in which a first rear end 112 is rotated at a predetermined angle from a first front end 111 so as to be twisted.

FIG. 4 illustrates the mixing part 100 and the supply part 200 of FIG. 3 viewed from the upper side to the lower side with respect to FIG. 3. As illustrated in FIGS. 3 and 4, the first rear end 112 of the first mixing member 110 may be rotated to be twisted by a 60 degrees angle from the first front end 111.

Since the second fluid B is supplied from the supply part 200 (to be described hereinafter) to the first inner side curved surface 114 formed as the first rear end 112 of the first mixing member 110 is rotated to be twisted by 60 degrees, relative to the first front end 111, and flow of the first fluid A and the second fluid B is changed through the first inner side curved surface 114, efficiency of mixing the two different fluids may be improved.

However, in the present invention, the degree to which the first rear end 112 of the first mixing member 110 is rotated to be twisted at a predetermined angle from the first front end 111 is not limited to 60 degrees, and the first rear end 112 may be rotated to be twisted from the first front end 111 within a range of 45 to 180 degrees.

As described above, since the first mixing member 110 and the second mixing member 120 have the same structure, in the exemplary embodiment of the present invention, the second rear end 122 of the second mixing member 120 may be rotated to be twisted by 60 degrees, relative to the second front end 121, and since the second rear end 122 of the second mixing member 120 may be rotated to be twisted by the predetermined angle, a second outer side curved surface 123 and a second inner side curved surface 124 are formed on both sides of the second mixing member 120.

As illustrated in FIGS. 3 and 4, the first mixing member 110 and the second mixing member 120 may be fixed to the inner circumferential surface of the piping and spaced apart from each other by a predetermined distance, an internal mixing space 130 may be formed between the first mixing member 110 and the second mixing member 120.

FIG. 5 illustrates a distance between the first mixing member 110 and the second mixing member 120. A width of the internal mixing space 130, i.e., a distance L2 between the first front end 111 and the second front end with respect to FIG. 5, may be ⅓ times an inner diameter L1 (diameter of the inner circumference) of the piping 110, and a distance L3 between the first front end 111 and the inner circumferential surface of the piping 10 and a distance L4 between the second front end 121 and the inner circumferential surface of the piping 10 may be ⅓ times the inner diameter L1 of the piping 10. However, in the present invention, the distance L2 is not limited to the ⅓ times the inner diameter of the piping 10 and may be 0.2 to 0.6 times. The distances L3 and L4 may each be a length obtained by subtracting the distance L2 from the distance L1.

As illustrated in FIGS. 3 to 5, the supply part 200 supplies the second fluid B to the internal mixing space 130. Here, the supply part 200 may supply the second fluid B to the internal mixing space 130 through a plurality of flow paths, and in order to realize the plurality of flow paths, the supply part 200 may include a first nozzle 210 and a second nozzle 220.

The first nozzle 210 and the second nozzle 220 may supply the second fluid B by the same amount and at the same supply rate by stopping the piping 10 from the outside.

As described above, the second fluid B supplied from the first nozzle 210 and the second fluid B supplied from the second nozzle 220 are mixed as flows thereof are changed along the first inner side curved surface 114 of the first mixing member 110 and the second inner side curved surface 124 of the second mixing member 120. Thus, the second fluids B supplied from the first nozzle 210 and the second nozzle 220 need to be supplied to the first inner side curved surface 114 and the second inner side curved surface 124, respectively. To this end, positions of the first nozzle 210 and the second nozzle 220 may overlap the areas of the first inner side curved surface 114 and the second inner side curved surface 124 respectively in FIG. 5 and may be symmetrical to each other with respect to the center C of the piping 10. That is, the distance D1 from the first nozzle 210 to the center C of the piping 10 and the distance D2 from the second nozzle 210 to the center C of the piping 10 may be equal to each other.

In the extensional mixing element according to the first exemplary embodiment of the present invention illustrated in FIGS. 3 to 5, the method of supplying, by the supply part 200, the second fluid in the two flow paths using the first nozzle 210 and the second nozzle 220 has been described, but the supply part 200 of the present invention is not limited thereto and the position and the number of the supply part 200 do not matter as long as the second fluid B is supplied to the internal mixing space 130 through the even number of flow paths and the supplied second fluid B is supplied to the inner side curved surfaces formed by the mixing members. Alternatively, in an embodiment, the second fluid supplied from the supply part 200 through the flow path may be supplied to a space between each of the first mixing member 110 and the second mixing member 120 and the piping 10, that is to the first outer side curved surface 113 and the second outer side curved surface 123.

FIG. 6 illustrates a side view of the extensional mixing element according to the first exemplary embodiment of the present invention. With respect to the length of the piping, a length L5 of the mixing part 100 illustrated in FIG. 6 may be 0.8 times the inner diameter of the piping 10 but it not limited thereto and the length L5 of the mixing part 100 may be 0.4 to 1.2 times the inner diameter of the piping 10.

As illustrated in FIG. 6, with respect to the length of the piping, positions of the ends of the first nozzle 210 and the second nozzle 220 are the same as positions of the front end of the mixing element or may be lower than the position of the front end of the mixing element in FIG. 5 (rear side with respect to the piping). This is to supply the second fluids supplied through the first and second nozzles 210 and 220 directly to the curved surface formed by the first mixing member 110 and the second mixing member 120, without being spread to other parts.

The extensional mixing element according to the first exemplary embodiment of the present invention illustrated in FIGS. 3 to 6 is installed at the front end of the static mixer and used for the purpose of preliminary mixing, which obtains a high mixing effect within a relatively short interval, while less differential pressure is applied, when two different types of fluids having a significantly high difference in viscosity.

Extensional Mixing Element According to Second Exemplary Embodiment

Hereinafter, an extensional mixing element according to a second exemplary embodiment of the present invention will be described in detail with reference to the accompanying drawings.

The extensional mixing element according to the second exemplary embodiment of the present invention is different from the extensional mixing element according to the first exemplary embodiment in that the rear ends of the first and second mixing members are twisted at different angles, relative to the front ends. Here, components not described in the second exemplary embodiment are regarded as being the same as those of the first exemplary embodiment.

FIG. 7 illustrates a cross-section of an extensional mixing element according to the second exemplary embodiment of the present invention.

As illustrated in FIG. 7, in the extensional mixing element according to the second exemplary embodiment of the present invention, the first mixing member 110 has a twisted plate-like shape and the first rear end 112 is rotated by about 120 degrees from the first front end 111 so as to be twisted to form the first outer side curved surface 113 and the first inner side curved surface 114 on both twisted side surfaces of the first mixing member 110 and as in the first exemplary embodiment. Since the first mixing member 110 and the second mixing member 120 have the same structure, the second rear end 122 of the second mixing member 120 is rotated by about 120 degrees from the second front end 121 so as to be twisted to form the second outer side curved surface 121 and the second inner side curved surface 124.

In the second exemplary embodiment of the present invention, the first mixing member 110 and the second mixing member 120 are twisted more than in the first exemplary embodiment, so that the curvature of each of the outer side curved surface and the inner side curved surface may be increased. Here, efficiency of mixing the first fluid and the second fluid may be improved, relative to the first exemplary embodiment, but a higher differential pressure than that of the first exemplary embodiment may be applied. Thus, the twisted degree of the first mixing member 110 and the second mixing member 120 may be variously used depending on viscosity and a supply rate of the first fluid and the second fluid.

As illustrated in FIG. 7, the first nozzle 210 and the second nozzle 220 supply the second fluid to the internal mixing space 130 in the same manner as in the first exemplary embodiment.

Extensional Mixing Element According to Third Exemplary Embodiment

FIG. 8 illustrates an extensional mixing element according to a third exemplary embodiment of the present invention.

As illustrated in FIG. 8, the third exemplary embodiment of the present invention is different from the first exemplary embodiment in that positions of the first and second nozzles 210 and 220 are changed. Thus, only the first and second nozzles 210 and 220 will be described, and the other components not described herein are regarded as being the same as those of the first exemplary embodiment.

As illustrated in FIG. 8, in the extensional mixing element according to the third exemplary embodiment of the present invention, the first and second mixing members 110 and 120 are twisted by 60 degrees as in the first exemplary embodiment but the second fluid is discharged from the first nozzle 210 and the second nozzle 220 to an external mixing space 140.

As illustrated in FIG. 8, the external mixing space 140 is a space between the first outer side curved surface 113 and the second outer side curved surface 123 and the piping 10, and the first nozzle 210 and the second nozzle 220 may supply the second fluid to the first outer side curved surface 113 and the second outer side curved surface 123, respectively, so that the first fluid and the second fluid may be mixed with each other.

A distance from each of the first nozzle 210 and the second nozzle 220 illustrated in FIG. 8 to the center C of the piping 10 may be equal.

In the third exemplary embodiment of the present invention illustrated in FIG. 8, the supply part supplies the second fluid to the external mixing space 140, but the present invention is not limited thereto and, as in the fourth exemplary embodiment of the present invention illustrated in FIG. 9, the first nozzle 210 and the second nozzle 220 may supply the second fluid to the first inner side curved surface 114 and the second inner side curved surface 124 of the internal mixing space 130 and the third nozzle 230 and the fourth nozzle 240 may supply the second fluid to the first outer side curved surface 113 and the second outer side curved surface 123 of the external mixing space 140.

The present invention is not limited to the exemplary embodiments described above, is varied in application coverage, and may be variously modified without departing from the scope of the present invention as defined by the appended claims.

DETAILED DESCRIPTION OF MAIN ELEMENTS

10: piping
20: right side mixing element
30: left side mixing element
100: mixing part
110: first mixing member
111: first front end
112: first rear end
113: first outer side curved surface
114: first inner side curved surface
120: second mixing member
121: second front end
122: second rear end
123: second outer side curved surface
124: second inner side curved surface
130: internal mixing space
140: external mixing space
200: supply part
210: first nozzle
220: second nozzle
230: third nozzle
240: fourth nozzle
C: center of piping

The invention claimed is:

1. A mixing system, the mixing system comprising: a piping through which a first fluid is supplied;

a mixing part including a first mixing member and a second mixing member installed in the piping, installed in a flow direction of the first fluid, having a plate-like shape in which a rear end thereof is twisted by a predetermined angle from a front end thereof, and disposed to be spaced apart from each other; and a supply part supplying a second fluid to a space between the first mixing member and the second mixing member, wherein side surfaces formed on each one side of the first mixing member and the second mixing member are disposed to face each other and are then installed at a same position based on the flow direction of the first fluid, and wherein the supply part comprises a first nozzle discharging the second fluid to the side surface of the first mixing member and along the flow direction of the first fluid, and a second nozzle discharging the second fluid to the side surface of the second mixing member and along the flow direction of the first fluid, wherein the first fluid and the second fluid are mixed by changing a flow of the first fluid and a flow of the second fluid through the side surface of the first mixing member and the side surface of the second mixing member.

2. The mixing system of claim 1, wherein the rear end of each mixing member is twisted at an angle of 45 to 180 degrees from the front end thereof.

3. The mixing system of claim 1, wherein a length of each mixing member from the front end to the rear end is 0.4 to 1.2 times a diameter of the piping.

4. The mixing system of claim 1, wherein a distance between the mutually adjacent mixing members is 0.2 to 0.6 times a diameter of the piping.

5. The mixing system of claim 1, wherein the supply part supplies the second fluid to a curved surface form on each side of each mixing member through the first nozzle and the second nozzle.

6. The mixing system of claim 1, wherein with respect to the length of the piping, a position of an end of the supply part through which the second fluid is discharged is the same as a position of the front end of each mixing member or the end of the supply part is positioned on a rear side, relative to the front end of each mixing member.

7. The mixing system of claim 1, wherein the first fluid has viscosity higher than viscosity of the second fluid.

8. The mixing system of claim 1, wherein the first fluid has viscosity 50 to 50000 times viscosity of the second fluid.

9. The mixing system of claim 1, wherein the first fluid is supplied in an amount larger than the second fluid.

10. The mixing system of claim 9, wherein the amount of the second fluid supplied to the piping is 1 wt % or less of the first fluid.

11. The mixing system of claim 1, further comprising: a static mixer disposed at a rear end of the mixing part.

* * * * *